United States Patent [19]

Sivavec et al.

[11] Patent Number: 5,162,449
[45] Date of Patent: Nov. 10, 1992

[54] CYCLOALKENE TERMINATED POLYARYLENE ETHER AND POLYARYLENE ETHERPOLYALKENAMER COPOLYMERS MADE THEREFROM

[75] Inventors: Timothy M. Sivavec; Sharon M. Fukuyama, both of Clifton Park, N.Y.

[73] Assignee: General Electric Company, Schenectady, N.Y.

[21] Appl. No.: 802,802

[22] Filed: Dec. 6, 1991

Related U.S. Application Data

[62] Division of Ser. No. 553,036, Jul. 16, 1990, Pat. No. 5,100,972.

[51] Int. Cl.$^5$ .......................................... C08F 283/08
[52] U.S. Cl. .................................. 525/391; 525/397; 528/181; 528/190
[58] Field of Search ................ 525/391, 397; 528/213

[56] References Cited

U.S. PATENT DOCUMENTS 4,841,001 6/1989 Hawkins .............................. 525/391

Primary Examiner—John Kight, III
Assistant Examiner—Richard L. Jones
Attorney, Agent, or Firm—William A. Teoli; William H. Pittman

[57] ABSTRACT

Polyarylene ether-polyalkenamer copolymers are provided by effecting a ring-opening metathesis polymerization (ROMP) of a cycloalkene such as, cyclooctene in the presence of a polyarylene ether having an ester link cycloalkenyl group. An effective amount of a metallic catalyst, such as an osmium or a ruthenium halide, can be used to catalyze the metathesis.

7 Claims, No Drawings

CYCLOALKENE TERMINATED POLYARYLENE ETHER AND POLYARYLENE ETHERPOLYALKENAMER COPOLYMERS MADE THEREFROM

This application is a division of application Ser. No. 07/553,036, field 07/16/90, now U.S. Pat. No. 5,100,972.

BACKGROUND OF THE INVENTION

The present invention relates to polyarylene ether terminated with an ester linked cycloalkene, such as a norbornene, and to polyarylene ether-polyalkenamer copolymers obtained therefrom.

Prior to the present invention, copolymers of polyphenylene ether and polyalkenamers elastomers could be made by extruding a commercially available polyarylene ether, such as, GE's PPO ® resin, having Mannich end groups, with a preformed polyoctenamer (VESTENAMER) of the Huls Company, Marl, West Germany. Grafting of the unsaturated polyoctenamer polymer to the polyarylene ether is believed to occur through the Mannich end groups.

Alternative procedures for making polyarylene ether-polyalkenamer copolymers are constantly being sought by the plastics industry. The ring opening polymerization of various cyclic monomers, such as norbornene, and cyclooctene, has been used to prepare various unsaturated polymers, such as porynorbornene (NORSOREX, CDF Chimie) and polyoctenamer utilizing ring-opening metathesis polymerization (ROMP). Attempts to prepare polyarylene ether-polyalkenamer block copolymers by ROMP procedures have thus far been unsuccessful.

A possible explanation as to why in situ-ring opening metathesis have been unsuccessful for making polyarylene ether - polyalkenamer copolymers is that the employment of a polyarylene ether having Mannich end groups interferes with the ring-opening metathesis reaction.

SUMMARY OF THE INVENTION

The present invention is based on the discovery that polyphenylene ether-polyalkenamer copolymers can be made utilizing a cycloalkene capped polyarylene ether, where the polyarylene ether, prior to capping, is made without the use of an amine containing catalyst, such as a manganese (II) chloride. In addition, it is preferred to use polyarylene ether capped with a cycloalkene, such as a norbornene, and joined to the polyarylene ether by an ester.linkage. Further, metal-catalyzed ring-opening polymerization of suitable cycloalkenes, such as norbornene or cyclooctene, can be effected in the presence of the cycloalkene capped polyarylene ether by using an effective amount of a metallic catalyst, for example a Group VIII transition metal catalyst of the platinum metals for example, a ruthenium halide or osmium halide.

STATEMENT OF THE INVENTION

There is provided by the present invention, a polyarylene ether having a cycloalkene terminal group of the formula,

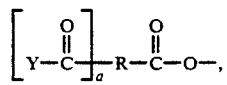

where R is a $C_{(4-20)}$ cycloalkenyl group, Y is a member selected from X and $-OR^1$, X is a halogen radical, $R^1$ is a $C_{(1-8)}$ alkyl radical, and a is a whole number equal to 0 or 1, and when a is 0, R is monovalent and when a is 1, R is divalent.

In another aspect of the present invention, there are provided polyarylene ether-polyalkenamer copolymers comprising polyarylene ether block chemically combined with polyalkenamer blocks by a connecting group having the formula

where $R^2$ is a $C_{(4-2)}$ divalent cycloaliphatic radical.

Some of the cycloalkene monomers which can be polymerized in the practice of the present invention to provide the polyalkenamer blocks of the polyarylene ether-polyalkenamer block copolymers include, for example, cyclobutene, cyclopentene, cycloheptene, cyclooctene, cyclononene, cyclodecene, cyclooctadiene, norbornylene, dicyclopentadiene, 5-norbornene-2-methanol, 7-oxanorbornene and deviatives of the above; cyclooctatetraene and 5-norbornene-2,3-dicarboxylic anhydride.

Polyarylene ether which can be used in the practice of the present invention have condensed units of the formula,

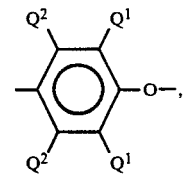

wherein in each of said units independently, each $Q^1$ is independently halogen, primary of secondary lower alkyl (i.e. alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q^2$ is independently hydrogen, halogen, primary or secondary lower alkyl, phenyl, haloalkyl, hydrocarbonoxy or halohydrocarbonoxy as defined for $Q^1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-,3- or 4-methylpentyl and the corresponding heptyl groups. Examples of secondary lower alkyl groups are isopropyl, sec-butyl and 3-pentyl. Preferably, and alkyl radicals are straight chain rather than branched. Most often, each $Q^1$ is alkyl or phenyl, especially $C_{1-4}$ alkyl, and each $Q^2$ is hydrogen.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units.

Also included are the coupled polyphenylene ethers in which the coupling agent is reacted in a known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals The polyphenylene ethers generally have a number average molecular weight within the range of about 3,000–40,000 and weight average molecular weight within the range of about 20,000–80,000, as determined by gel permeation chromatography. Their intrinsic viscosities are most often in the range of about 0.35–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xyleno (wherein each $Q^1$ is methyl and each $Q^2$ is hydrogen), whereupon the polymer may be characterized as a poly(2,6-dimethyl-1,4-phenylene ether), and 2,3,6-trimethylphenol (wherein each $Q^1$ and one $Q^2$ is methyl and the other $Q^2$ is hydrogen).

A variety of catalyst systems are known for the preparation of polyphenylene ethers by oxidative coupling. There is no particular limitation as to catalyst choice and any of the known catalysts can be used. For the most part, they contain at least one heavy metal compound such as a copper, manganese or cobalt compound, usually in combination with various other materials.

A first class of preferred catalyst systems consists of those containing a copper compound. Such catalysts are disclosed, for example, in U.S. Pat. Nos. 3,306,874, 3,306,875, 3,914,266 and 4,028,341. They are usually combinations of cuprous or cupric ions, halide (i.e., chloride, bromide or iodide) ions.

Catalyst systems containing manganese compounds constitute a second preferred class. They are generally alkaline systems in which divalent manganese is combined with such anions as halide, alkoxide or phenoxide. Most often, the manganese is present as a complex with one or more complexing and/or chelating agents such as o-hydroxyaryl oximes and β-diketones. Also useful are known cobalt-containing catalyst systems.

The invention is particularly applicable to polyphenylene ethers which comprise molecules having an end group of the formula,

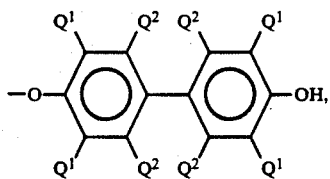

wherein $Q^1$ amd $Q^2$ are as previously defined.

The cycloalkene terminated polyarylene ether which can be used in the practice of the present invention to make the polyarylene ether-polyalkenamer block copolymers can be made by affecting reaction between a polyarylene ether which is substantially free of Mannich end groups, and a cycloalkenyl carbonyl halide having the formula,

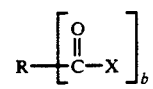

(3)

where R is as previously defined, and b is an integer having a value of 1 or 2, and when b is 1, R is monovalent, and when b is 2, R is divalent. Some of he carbonyl halides which are included within formula (3) are for example,

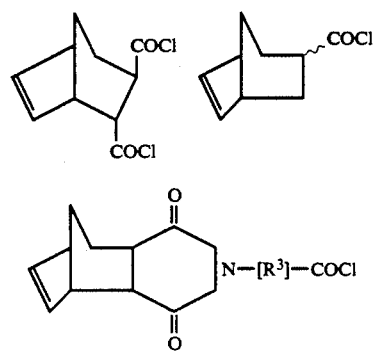

where $R^3$ is $C_{(6-13)}$ aryl or $C_{(1-5)}$ alkyl

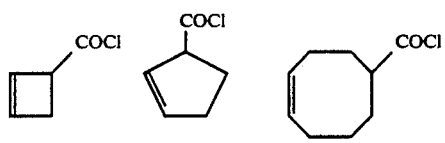

The reaction of the cycloalkene carbonyl halide of formula 3 and the polyarylene ether can be facilitated with the use of a phase transfer catalyst (PTC) such as tricaprylmethylammonium chloride (ALIQUAT 336), or methyltrialkyl ($C_8$-$C_{10}$)ammonium chloride (ADOGEN 464). Tert-organic amines such as such as N,N-dimethyl-N-butylamine, triethylamine and 4-dimethylaminopyridine, also can be used in place of the phase transfer catalyst. Some of the terminal units which are included within formula 1 have the formula,

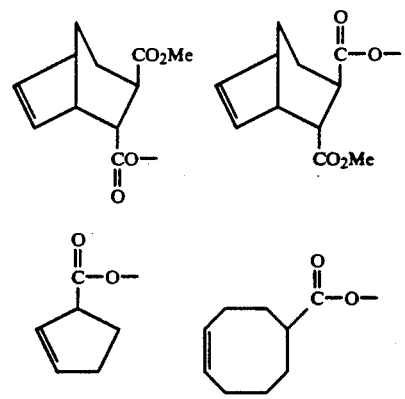

where Me is methyl

Some of the metal catalysts which can be used are for example, $RuCl_3$, $OsCl_3$, $WCl_6$ and $MOCl_5$. These catalysts can be used with cocatalysts such as $SnMe_4$, alkyl aluminum chlorides, alkyl aluminums, and acetylenes.

In general, metal catalysts that are active in alkene metathesis are also included in the method of the present invention.

The polyarylene ether-polyalkenamer copolymers of the present invention can be made by affecting reaction between the cycloalkene terminated polyarylene ether and cycloalkene monomers as previously defined in the presence of an effective amount of the metal halide catalyst. It has been found that a minor amount of an alkanol, such as ethanol, or water, or a mixture thereof, can facilitate reaction as a co-catalyst with the aforementioned metal halides such as ruthenium trichloride or osmium trichloride. An effective amount of the metal halide is an amount by weight sufficient to provide from 200 to 5000 parts of metal, per million parts mixture, and preferably from 400 to 2000 parts of metal, per million parts of mixture of cycloalkene capped polyarylene ether and cycloalkene. Polymerization can be conducted in the presence of an organic solvent such as toluene.

In order that those skilled in the art will be better able to practice the present invention, the following examples are given by way of illustration and not by way of limitation. All parts are by weight.

EXAMPLE 1

A solution of 100 ml of toluene and 35 grams of a polyphenylene ether prepared from the oxidative coupling of 2,6-dimethylphenol using a manganese (II) chloride/benzoin oxime catalyst, and having an intrinsic viscosity of 0.41 dl/g was vigorously stirred, in a blender. There was added to the stirred solution, 180 of ALIQUAT 364, and 10 ml of a 50% NaOH solution. After 2 minutes of blending, there was added dropwise, 1.40 grams of trans-3,6-endomethylene-1,2,3,6-tetrahydrophthaloyl chloride. The resulting slurry was stirred for 5 minutes then diluted with an additional 100 ml toluene. The product was precipitated by the addition of methanol. The product was collected by filtration and redissolved in 200 ml of toluene and reprecipitated by the addition of methanol. Based on method of preparation, the product was a polyphenylene ether capped with a norbornene group having the formula,

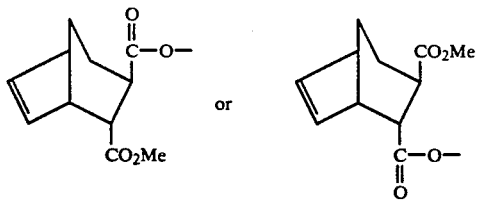

It was collected by filtration, washed with methanol and dried in vacuo at 80° C. for 12 hours. The product had an OH content of 0.0055%. The modified polyphenylene ether was further identified by its extinction coefficients for the 1740 and 1747 cm$^{-1}$ ester carbonyl absorbances.

EXAMPLE 2

The procedure of Example 1 was repeated, except that 2.5 grams of the trans-5-norbornene-2,3-dicarbonyl chloride was used with 50 grams of the polyphenylene ether. In addition 1.27 grams N,N-dimethyl-N-butylamine was employed in place of Aliquat ®364 and 50% NaOH solution. The reaction mixture was heated at reflux for 2 hours. Upon cooling to room temperature and diluting with 500 ml of toluene, the solution was precipitated by the addition of methanol. There was obtained a norbornene capped polyphenylene ether having 0.0047% of OH content and 0.58 norbornene end caps per polyphenylene ether chain.

EXAMPLE 2

There was added a solution of 4 grams of 5-norbornene-2-methanol and 20 ml of absolute ethanol and 5 ml of water to a solution of 10 grams of the norbornene capped polyphenylene ether resin of example 1 dissolved in 100 ml of toluene. The resulting solution was heated to reflux to completely dissolve any polyphenylene ether that precipitated out of solution upon the addition of ethanol and water. Once the reaction mixture was cooled to 60° C., 15 milligrams of ruthenium trichloride halide having 40.89% ruthenium was added. The reaction mixture was stirred at 60° C. for 24 hours under a nitrogen atmosphere. Product was isolated by the addition of methanol to the reaction mixture in a blender. The precipitated product was collected by filtration, washed with methanol and dried in vacuo at 80° C. Based on method of preparation, the product was a polyphenylene ether-poly(5-norbornene-2-methanol copolymer. The yield of product was 13.76 grams. The copolymer had a composition of about 66% by weight of polyphenylene ether and about 34% by weight of poly(5-norbornene-2-methanol). The crude copolymer was dissolved in 35 ml of warm methylene chloride and then chilled at 0° C. for 3 days. A precipitate formed; it was filtered off, washed with cold methylene chloride, and dried in vacuo at 80° C. There was obtained a yield of 1.87 grams from the original 2.5 grams of the crude product. The filtrate was evaporated to dryness to produce 0.60 gram. The identity of the copolymer was further confirmed by $^1$H NMR analysis.

EXAMPLE 4

The procedure of Example 3 was repeated, except that in place of the 5-norbornene-2-methanol, there was used a mixture of 1 gram of norbornylene and 1 gram of the 5-norbornene-2-methanol. An 11.82 grams of the crude copolymer was obtained. The crude copolymer was then analyzed in accordance with the procedure of Example 3. It was found that the copolymer consisted of about 69% of polyphenylene ether and about 31% of polynorbornene-poly(5-norbornene-2-methanol) random copolymer.

EXAMPLE 5

The procedure of Example 3 was repeated, except that a series of monomers were substituted for the 5-norbornene-2-methanol. In addition, norbornene capped polyphenylene ether was used which had been made in accordance with the procedure of Example 1 using a phase transfer catalyst (PTC) or an amine catalyst. A variety of monomers were used such as norbornene, cyclooctene, 7-oxa-5-norbornene-2,3-dimethanol and other monomers. In addition, various ratios of monomer and polyphenylene ether were used. The percent yield of the polyalkenamer as well as the polyphenylene ether/polyalkenamer copolymer were also determined using H-NMR analysis The following results were obtained where "PPE" is polyphenylene ether:

| Monomer | Norbornene-Capped PPE[a] | Ratio of Monomer/PPE | Catalyst | % Yield Polyalkenamer[b] | PPE/Polyalkenamer Ratio in Copolymer[c] |
|---|---|---|---|---|---|
|  | PTC | 0.2 | RuCl₃ | 95 | 80/20 |
|  | PTC | 0.2 | OsCl₃ | 80 | 74/26 |
| 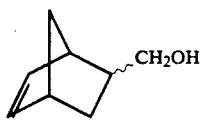 | PTC<br>Amine | 0.4<br>0.4 | RuCl₃<br>RuCl₃ | 94<br>90 | 66/34<br>71/29 |
| 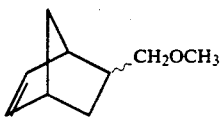 | PTC | 0.2 | RuCl₃ | 98 | 70/30 |
| 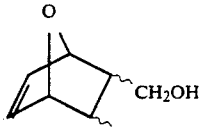 | PTC<br>Amine | 0.2<br>0.2 | RuCl₃<br>OsCl₃ | 93<br>83 | 87/13<br>89/11 |
| 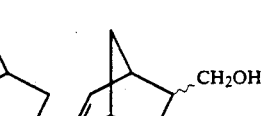<br>2:1 | PTC | 0.2 | RuCl₃ | 91 | 69/31 |

[a] PTC: phase transfer catalyzed procedure. Amine: triethylamine procedure.
[b] Assuming 100% recovery of PPE from cycloalkene polymerization.
[c] Determined from ¹H NMR analysis of reaction product upon CH₂Cl₂ complexation.

Although the above results are directed to only a few of the very many variables which can be employed in the practice of the present invention, it should be understood that a much broader variety of cycloalkylenyl monomers and cycloalkenyl capped polyphenylene ether and catalyst can be employed as set forth in the description preceding these examples.

What is claimed is:

1. A method for making a polyarylene ether-polyalkenamer black copolymer which comprises, effecting a ring opening methathesis polymerization between
   (1) a polyarylene ether having a terminal group of the formula

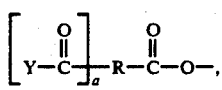

and $C_{(4-5)}$ or $C_{(7-20)}$ cycloalkene in the presence of an amount of a Group VIII transition metal catalyst, sufficient to provide from 200 to 5000 parts of metal, per million parts of mixture of cycloalkene capped polyarylene-ether and cycloalkene, and
   (2) recovering a polyarylene ether-polyalkenamer copolymer from the mixture of (1),
where R is a $C_{(4-20)}$ cycloalkenyl group, Y is a member selected from the group consisting of X and —OR¹, wherein X is a halogen radical, R¹ is a $C_{(1-8)}$ alkyl radical, and a is a whole number equal to 0 or 1, and when a is 0, R is monovalent, and when a is 1, R is divalent.

2. A method in accordance with claim 1, where the polyarylene ether is a polyphenylene ether.

3. A method in accordance with claim 1, where R is a norbornene radical.

4. A method in accordance with claim 1, where the Group VIII transition metal catalyst is a ruthenium halide.

5. A polyarylene ether-polyalkenamer black copolymer produced by the method of claim 1 comprising a polyarylene ether block chemically combined with a polyalkenamer block by a connecting group having the formula,

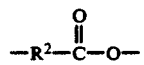

where R² is a $C_{(4-20)}$ divalent cycloaliphatic radical.

6. A polyarylene ether-polyalkenamer black copolymer in accordance with claim 5, where the polyalkenamer block consists essentially of chemically combined octylene radicals.

7. A polyarylene ether-polyalkenamer black copolymer in accordance with claim 5, wherein the polyalkenamer block consists essentially of chemically combined norborneneol units.

* * * * *

UNITED STATES PATENT AND TRADEMARK OFFICE
CERTIFICATE OF CORRECTION

PATENT NO. : 5,162,449
DATED : November 10, 1992
INVENTOR(S) : Timothy M. Sivavec, et. al.

It is certified that error appears in the above-indentified patent and that said Letters Patent is hereby corrected as shown below:

Column 7, line 49, cancel "black" and substitute -- block --

Column 8, line 51, cancel "black" and substitute -- block --

Column 8, line 61, cancel "black" and substitute -- block --

Column 8, line 65, cancel "black" and substitute -- block --

Signed and Sealed this

Nineteenth Day of October, 1993

Attest:

BRUCE LEHMAN

*Attesting Officer*      *Commissioner of Patents and Trademarks*